June 7, 1932.  E. LEFKOWITZ  1,861,635
HOSE COUPLING
Filed April 24, 1929   3 Sheets-Sheet 1
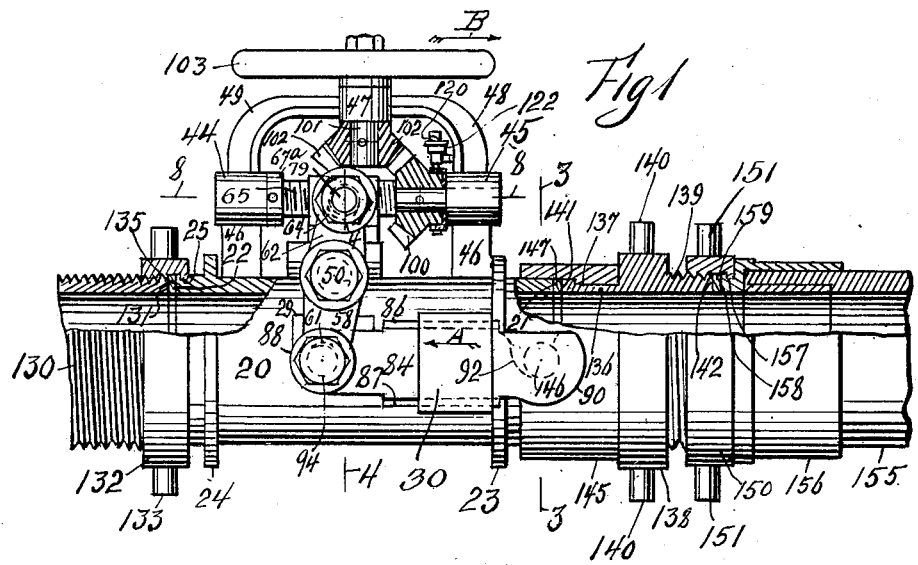
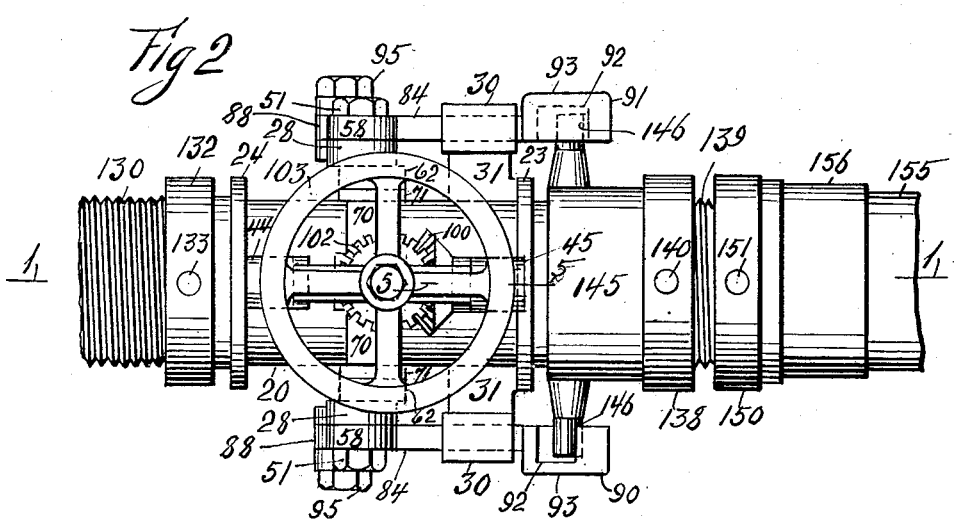
Inventor
Emanuel Lefkowitz
By his Attorney
A. A de Romeville June 7, 1932.                E. LEFKOWITZ                1,861,635
                             HOSE COUPLING
                        Filed April 24, 1929         3 Sheets-Sheet 2
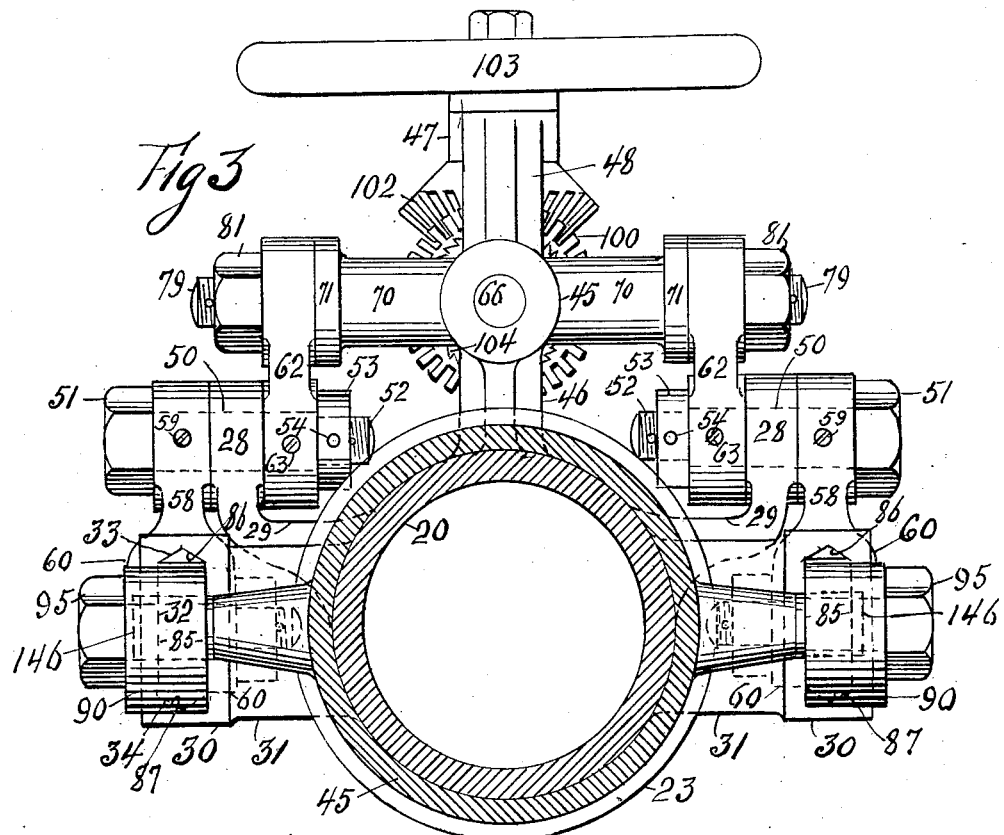
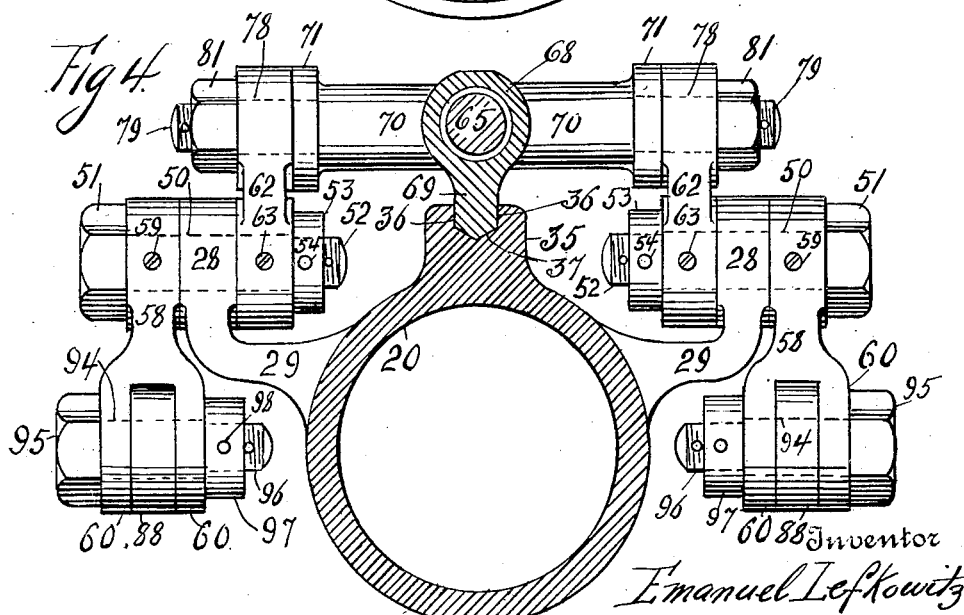
Inventor
Emanuel Lefkowitz
By his Attorney

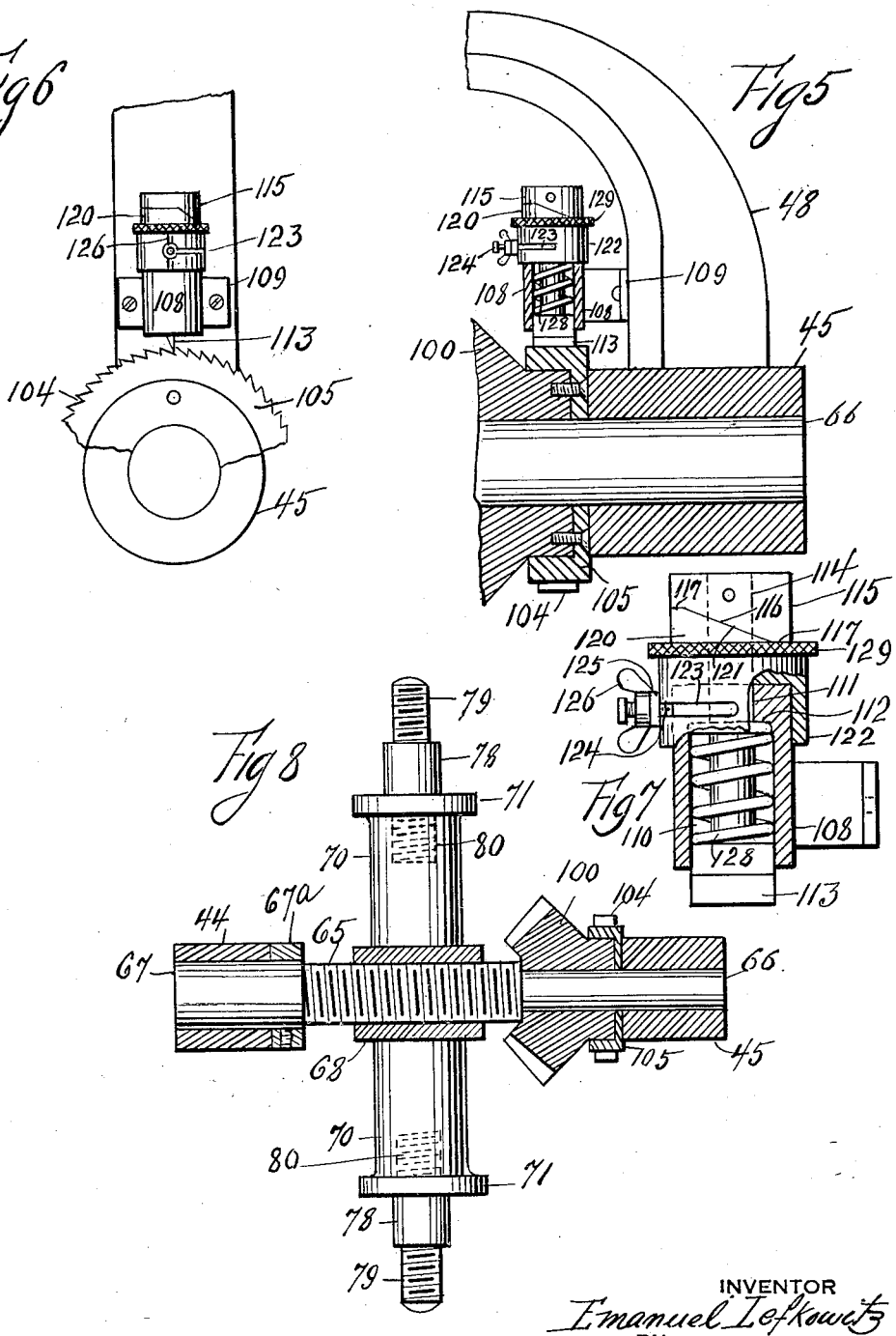

Patented June 7, 1932

1,861,635

UNITED STATES PATENT OFFICE

EMANUEL LEFKOWITZ, OF CARTERET, NEW JERSEY

HOSE COUPLING

Application filed April 24, 1929. Serial No. 357,711.

This invention relates to a hose coupling.

The object of the invention is the production of means by which a stationary conduit and a flexible conduit can be quickly and tightly connected. The second object of the invention is the production of a coupling, which can be easily connected to a hose and detached therefrom. The third object of the invention is the production of a coupling which can easily be detached from appurtenances extending from a line of hose, when such appurtenances are frozen with ice.

In the accompanying drawings Fig. 1 represents a partial side elevation and partial section as on the line 1, 1 of Fig. 2 of an exemplification of the improved coupling; Fig. 2 shows a top plan view of Fig. 1; Fig. 3 indicates an enlarged right hand end view and section of Fig. 1 on the line 3, 3; Fig. 4 is a partially enlarged right hand end view and section of Fig. 1 on the line 4, 4; Fig. 5 represents an enlarged fragmentary portion and partial section of Fig. 2 on the line 5, 5; Fig. 6 represents a left hand end view of Fig. 5; Fig. 7 shows an enlarged partial fragmentary portion of Fig. 5 and Fig. 8 shows an enlarged section of Fig. 1 on the line 8, 8.

The coupling comprises the cylindrical shell 20 having the end faces 21 and 22 and the annular flanges 23 and 24. Adjacent to the end face 22 is formed the groove 25. A pair of journal bearings 28 are located on the opposite sides of the shell 20 and above the axial center thereof. Brackets 29 extend between the outer circumferential face of said shell 20 and support the journal bearings 28. Slide bearings 30 are positioned on opposite sides of the shell 20 and brackets 31 connect the bearings 30 and said shell 20. Each of the bearings 30 has a longitudinal guide opening 32 having an angular shaped top face 33 and an angular shaped bottom face 34. A longitudinal guide bracket 35 extends up from the shell 20 and has formed thereon the longitudinal guide faces 36 with the angular bottom face 37. Above the shell 20 are located a pair of journal brackets 44 and 45 parallel to longitudinal axis of said shell. The latter journal brackets are connected to the shell 20 by means of the connecting members 46. A journal bearing 47 is located above and at right angles to the journal bearings 44 and 45. Connecting members 48 and 49 connect the journal bearing 47 and the journal bearings 44 and 45.

A journal pin 50 is journaled in each of the journal bearings 28. Each of the journal pins 50 has formed therewith the hexagonal head 51 and the threaded shank 52. The latter is provided with cylindrical nut 53, having the openings 54. To each of the journal pins 50 is fastened a lower lever 58 by means of set screws 59. The lower end of each lever 58 is forked shaped having the members 60 with the elongated openings 61. To each of the journal pins 50 is also pinned the upper lever 62 by means of set screws 63. Elongated openings 64 are formed in the upper ends of the levers 62.

An adjusting screw 65 is located with its longitudinal axis parallel to and spaced from the shell 20. The said adjusting screw 65 has formed therewith the cylindrical shanks 66 and 67. The latter shank is somewhat smaller in diameter than the screw 65 and the shank 67 is somewhat larger in diameter. The shank 67 has fastened thereto the collar 67a. The adjusting screw 65 carries an adjusting nut 68, which has formed therewith the depending slide 69, which engages the guide bracket 35. A pair of arms 70 extend from the nut 68 and each has formed therewith the cylindrical flange 71. Journal pins 78 extend from the flanges 71 having each formed therewith the threaded shanks 79 and 80. The opening 64 in the levers 62 engage the journal pins 78. Nuts 81 engage the threaded shanks 79 to maintain the levers 62 in lateral position.

A pair of clamping bars 84 are indicated with the parallel side faces 85 and the angular top and bottom faces 86 and 87. A curved end 88 is formed with one end of the each of the bars 84. At the other end of one of the bars 84 is formed the clamping claw 90 and at the other end of the other bar 84 is formed the clamping claw 91. The latter claw is oppositely positioned to the claw 90. Each of the said claws 90 and 91 is indicated with the enlarged seating pocket 92 having the outer wall 93.

A pair of journal pins 94 are each indicated with the head 95 and the threaded shank 96. The pins 94 connect each of the lower ends of the levers 58 to the clamping bars 84. A cylindrical nut 97, having the openings 98, is in threaded engagement with each of the shanks 96 and maintains the levers 58 and the bars 84 in lateral adjustment.

To the shank 66 is fastened the bevel gear 100 and in the journal bearing 47 is journaled a journal pin 101, to which latter is fastened a bevel gear 102, which is in mesh with the bevel gear 100. An operating hand wheel 103 is fastened to the journal pin 100. A cup shaped ratchet wheel 104 having the annular side flange 105 is fastened to the hub of the bevel gear 100. Above the ratchet wheel 104 is located the housing 108, that has extending therefrom the bracket 109, that is fastened to the member 48. The housing 108 has rectangular cavity 110 which joins with the cylindrical opening 111 at its top end forming the shoulder 112. A ratchet having the ratchet tooth 113 is slidably supported in the cavity 110 and has extending therefrom the cylindrical shank 114. To the latter is fastened the head 115 with the inclined cam side wall 116, having the flat ends 117. Between the top face of the housing 108 and the head 115 is interposed the ring cam 120 having an inclined cam wall 121 and flat ends, corresponding to the wall 116 and the ends 117. The ring cam 120 has formed therewith the annular flange 122 which encircles the casing 108. An annular guide groove 123 is formed in the sleeve 122. A stud 124 extends from the casing 108 and passes through the groove 123. A washer 125 encircles the stud 124 and a wing-nut 126 is in threaded engagement with the stud 124. A spring 128 bears between the shoulder 112 and the ratchet 113, and a knurled flange 129 extends from the housing 108. The ratchet having the tooth 113 constitutes a locking device for the screw 65.

A stationary threaded nipple 130 having the end face 131 (see Figs. 1 and 2) is indicated engaged to the swivel nut 132 having the adjusting pins 133. The nut 132 engages the groove 25 of the shell 20 in the usual way. A ring 135 of flexible packing is interposed between the end faces 22 and 131.

The body portion 136 of an adapter is indicated with the depressed portion 137, the raised annular portion 138 and the threaded portion 139. Adjusting pins 140 extend from the raised portion 138. The end faces of the adapter are indicated at 141 and 142. A sleeve 145 is rotatively supported on the adapter and locks with the depressed portion 137. Locking pins 146 extend from the sleeve 145. A flexible annular packing 147 is located between the end faces 21 and 141. A swivel nut 150 having the pins 151 is in threaded engagement with the threaded portion 39 of the body portion 136 of the adapter. A line of hose is indicated at 155 and is provided with the usual sleeve 156 having the depression 157 and the end face 158. The swivel nut 150 engages the depression 157 as well as the threaded portion 139 as already described. An annular flexible packing 159 is interposed between the end faces 142 and 158.

To use the coupling it is connected to the nipple 130, by means of the swivel nut 132 in the usual way. The ring of flexible packing 135 secures a tight joint between the end faces 22 and 131. Next the sleeve 145 is located on the end of the shell 20 adjacent to the end face 21, and the locking pins 146 are seated in the seating pockets 92 of the clamping claws 90. It will be noted that by the reversed positions of pockets 92 the locking pins 146 can be easily and quickly swung in position in said pockets 92. The end faces 142 and 158 are brought to press against the flexible packing 159 by means of the swivel nut 150. The operator now turns the operating hand wheel 103, and thereby through the bevel gears 100 and 102 the adjusting screw 65 is turned. With the turning of the screw 65 the adjusting nut 68 travels on said screw. Thereby the upper levers 62 are swung, and a partial rotation is made by the journal pins 50. With the partial rotation of the pins 50 the lower levers 58 are swung, which move the clamping bars 84 in the direction of the arrow A. The clamping claws 90 and 91 engage the locking pins 146 and a tight joint is made between the end face 141 of the adapter having the body 136, the packing 147 and the end face 21 of the shell 20.

To remove the adapter from the shell 20 the operating hand wheel 103 is turned in an opposite direction or to the left in the direction of the arrow B, and the clamping claws 90 and 91 bear against the locking pins 146 in a direction opposite to the direction of the arrow A, and the adapter is removed from the shell 20 even if frozen thereto. When the nut 68 has been located in position, it is maintained in position by means of the ratchet having the tooth 113 locking with the ratchet wheel 104.

It will be noted that with the construction shown and described, packings of different thicknesses may be used.

The adapter having the body portion 136 may be omitted and the clamping claws may be made to engage the pins 151 of the member of the hose coupling.

Various modifications may be made in the invention and the present exemplification is to be taken as illustrative and not limitative thereof.

Having described my invention what I desire to secure by Letters Patent and claim is:

1. In a coupling the combination of a shell, a pair of clamping bars each having a clamping claw slidably supported on opposite sides of the shell, a screw having cylindrical shanks at its ends journaled above the shell, an adjusting nut in engagement with said screw, a pair of journal pins rotatively supported on the opposite sides of the shell, an upper lever fastened to each of said journal pins with its swinging end in connection with said nut, a lower lever fastened to each of said journal pins, the lower ends of said lower levers pinned to said clamping bars, means to turn the screw, an adapter axially in line with the shell and locking pins extending from the adapter disposed to be engaged by said clamping claws.

2. In a coupling the combination of a shell, a pair of clamping bars each having a clamping claw slidably supported on opposite sides of the shell, a screw having its ends journaled above the shell, a gear fastened to one end of the screw, a second gear in mesh with the first gear, an operating hand wheel disposed to turn the second gear, an adjuster nut in engagement with said screw, journal pins rotatively supported on opposite sides of the shell, a pair of oppositely positioned levers fastened to each of said journal pins, the swinging end of one lever of each pair pinned to said nut and the other lever of each pair pinned to one of said clamping bars, an adapter axially in line with the shell and locking pins extending from the adapter disposed to be engaged by said clamping claws.

3. In a coupling the combination of a shell, a pair of journal bearings above and parallel to said shell, a third journal bearing at right angles to said shell, a pair of reciprocating clamping bars each having a clamping claw slidably supported at the sides of the shell, a screw having cylindrical shanks at its ends, journaled in the journal bearings parallel to the shell, a nut in threaded engagement with said screw, levers interposed between said nut and said clamping bars, an adapter rotatively supported on one end of said shell, locking pins extending from said adapter disposed to be engaged by said clamping claws, a bevel gear fastened to one of the shanks of said screw, a journal pin journaled in said third journal bearing, a bevel gear fastened to the latter journal pin in mesh with the other bevel gear, a ratchet wheel fastened to hub of the bevel gear on the shank of said screw, a housing supported above the ratchet wheel, a ratchet slidably supported in said housing, a spring bearing between a portion of said ratchet and a shoulder in the housing, said ratchet extending above said housing, a head fastened to the upper end of the ratchet above said housing, an inclined cam shaped wall at the lower end of said head, a ring cam rotatably supported on the housing below said head, the said ring cam having an inclined face at its upper end engaging the inclined cam wall of the head and means to turn the ring cam to disengage said ratchet from said ratchet wheel.

4. In a coupling the combination of a shell, a pair of clamping bars each having a clamping claw slidably supported at the sides of the shell, a screw having cylindrical shanks at its ends journaled above the shell, a nut in threaded engagement with said screw, connecting means between said nut and said bars, an adapter rotatively supported on one end of said shell, locking pins extending from said adapter disposed to be engaged by the clamping claws, a bevel gear fastened to one of the shanks of said screw, a second bevel gear in mesh with the first bevel gear, means to turn the second bevel gear, a ratchet wheel turning with the first bevel gear, a ratchet coacting with said ratchet wheel and means to disengage said ratchet from said ratchet wheel.

5. In a coupling the combination of a shell, slide bearings extending from opposite sides of the shell, a clamping bar having a clamping claw slidably supported in each of said slide bearings, a longitudinal guide bracket extending from the upper portion of said shell, a screw having its ends journaled above the shell, a nut in threaded engagement with said screw, a depending slide extending from said nut engaging the guide bracket at the upper portion of the shell, connecting means between said nut and said bars, an adapter rotatively supported on one end of said shell, locking pins extending from said adapter disposed to be engaged by the clamping claws and means to turn said screw and thereby move said clamping claws to lock said adapter to said shell.

6. In a coupling the combination of a shell, a pair of clamping bars slidably supported at the sides of the shell, a screw having cylindrical shanks at its ends, said shanks journaled above the shell, an adjusting nut in engagement with said screw, means to turn the screw and connecting means between said nut and said bars to reciprocate the latter with the turning of the screw.

Signed at the borough of Manhattan, city of New York in the county of New York and State of New York this 17th day of April A. D. 1929.

EMANUEL LEFKOWITZ.